United States Patent [19]
Freeman

[11] Patent Number: 5,621,641
[45] Date of Patent: Apr. 15, 1997

[54] COMPUTER ASSISTED TEXT SYSTEM

[76] Inventor: Alfred B. Freeman, 1465 Hooksett Rd., #377, Hooksett, N.H. 03106

[21] Appl. No.: 476,640

[22] Filed: Jun. 7, 1995

Related U.S. Application Data

[63] Continuation-in-part of Ser. No. 808,843, Dec. 17, 1991, which is a continuation-in-part of Ser. No. 440,994, Nov. 22, 1989, abandoned, which is a continuation-in-part of Ser. No. 392,727, Aug. 11, 1989, abandoned, and a continuation-in-part of Ser. No. 288,011, Dec. 21, 1988, abandoned.

[30] Foreign Application Priority Data

Dec. 21, 1989 [CA] Canada .................................. 2006163

[51] Int. Cl.⁶ ........................................ G06F 3/14
[52] U.S. Cl. ...................... 395/796; 364/709.01; 341/20; 341/22; 341/23; 341/26
[58] Field of Search ................................ 341/20, 22, 23, 341/26; 364/419.1, 419.4, 419.15, 419.16, 419.17, 709.01, 709.11, 709.12, 709.13, 709.14, 709.15, 709.16; 400/98, 100

[56] References Cited

U.S. PATENT DOCUMENTS

| | | | |
|---|---|---|---|
| 4,650,349 | 3/1987 | Westreich | 400/98 |
| 4,763,252 | 8/1988 | Rose | 341/23 |
| 4,937,778 | 6/1990 | Wolf et al. | 341/26 |
| 5,200,988 | 4/1993 | Riskin | 379/52 |
| 5,404,321 | 4/1995 | Mattox | 341/23 |
| 5,473,325 | 12/1995 | McAlindon | 341/20 |

*Primary Examiner*—Jeffery Hofsass
*Assistant Examiner*—Andrew Hill

[57] ABSTRACT

On word starts, the system displays sets of very frequent words and attributes in locations which associate them with input actions. Possible attributes include letters, phonetic sounds, character strokes or parameters as appropriate for the language. Attributes inputted select word sets from a vocabulary which has N sets of a plurality of word sets in which the words of each set share a unique set of one to N attributes. The display presents accessed word sets which the user may search for wanted words. Vocabulary words include codes to select inflection sets when they are selected. For alphabetic languages, spelling rules and a store of modified word ends and inflection starts are used in the application of inflections. Selected words, with or without inflections, are outputted by input actions which may append 'Space' or punctuation endings. User actions on keyboard and/or stroke sensing apparatus input attributes and select, inflect, and output words with endings. Some keyboard apparatus responds to key combinations and others to single keys. Stroke apparatus senses motion of a mouse in each of a plurality of directions and patterns and inputs data items associated with the respective motions.

12 Claims, 4 Drawing Sheets

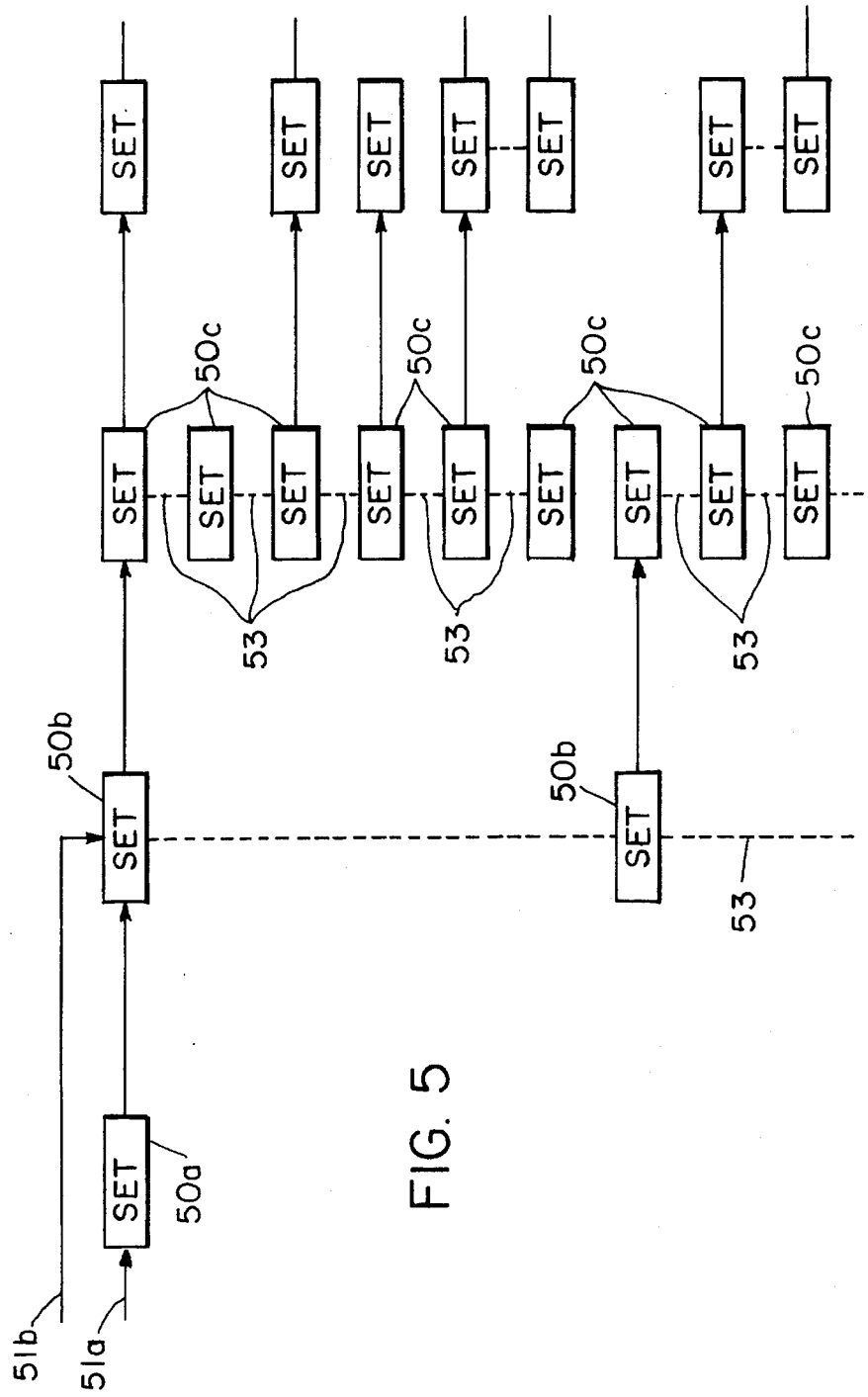

COMPUTER ASSISTED TEXT SYSTEM

This application is a continuation-in-part of pending U.S. patent application Ser. No. 07/808,843 filed Dec. 17, 1991 which is a continuation-in-part of now abandoned U.S. patent application Ser. No. 07/440,994 filed Nov. 22, 1989 which is a continuation-in-part of now abandoned U.S. patent application Ser. No. 07/392,727 filed Aug. 11, 1989 and Ser. No. 07/288,011 filed Dec. 21, 1988, the parents being included herein by reference.

BACKGROUND OF THE INVENTION

1. Field of the Invention

The present invention is directed generally to improvements in systems to input text to computer applications and the like and particularly to systems which require less input data than that contained in the words themselves.

The invention systems include both keyboard and stroke input systems. The keyboard systems, here-in-after referred to as computer assisting typing, or CAT, systems use both key down and key up signal inputs. The stroke systems use signals from minimum movements of a mouse, pen, or similar device for input.

2. Discussion of the Prior Art

The following includes art cited by the Patent Office in actions on the parent applications and art previously discussed in the parents. It serves as background although much is not directly pertinent to the present case.

CHORD TYPING SYSTEMS:

Stenograph systems registered combinations of key actuations on a paper tape and advanced the tape when all keys had been released. Typewriter systems used shift keys to change the characters outputted by other keys operated at the same time. The subsequent art is replete with systems using chords, or key combinations, of various types to improve the typing of text in one way or another. Some examples of different types of chording systems for text typing follow:

MECHANICAL TYPEWRITER WORD TYPING:

Bullock, U.S. Pat. No. 1,275,657, added keys to a typewriter to type words.

Seiber, U.S. Pat. No. 2,717,686, added a special shift key so other keys typed words when operated with it.

Schaefer, U.S. Pat. No. 3,289,804, typed words with keys depressed beyond their normal range.

STENOGRAPHIC KEYBOARD WORD/TEXT TYPING:

Ralston, U.S. Pat. No. 1,590,998, suggests, but does not implement, the selection of a set of words with one key followed by the selection of a word from the set with another key. The word sets include sets of words with a particular suffix or inflected form.

Baisch, U.S. Pat. No. 3,558,820, attempts a system for producing text from stenographic type inputs with an enlarged keyboard that includes keys added for words, prefixes and suffixes.

Ayres, U.S. Pat. No. 3,225,883, Wright, U.S. Pat. No. 3,557,927, Binenbaum, U.S. Pat. No. 3,597,538, Budworth et. al., U.S. Pat. No. 3,892,915, and Lefler, U.S. Pat. No. 4,765,764, are also examples of systems that produce text from stenographic inputs.

Toth, U.S. Pat. No. 4,566,065, assigns ten words to digit keys, other words to two letter key codes starting with 'x', 'y', or 'z', and other words to codes with the first two letters of the words and end with the last letters.

ONE HAND CHORD TYPING:

Bequaert et. al., U.S. Pat. No. 4,042,777, produces both words and characters from chords determined by detection of First Released Keys or All Released Keys.

Eilam et. al., U.S. Pat. No. 4,833,446, Enfield, U.S. Pat. No. 4,442,506, Jensen, U.S. Pat. No. 4,836,700, are other examples of one handed typing systems.

TIMING OF KEY OPERATIONS FOR CHORDS:

Rollhaus et. al., U.S. Pat. Nos. 4,638,306 & 4,674,280, and Goldwasser, U.S. Pat. No. 4,891,786, use the time intervals between operations of key combinations to distinguish chords.

ABBREVIATED TYPING OF WORDS:

Arellano et. al. "Word Generation System for Typists", IBM Technical Disclosure Bulletin, Vol 17, No. 8, January 1975, describes a system which generates the final portions of words after the typing of strings of first letters.

Todd, "Abbreviated Typing for Word Processing", IBM Technical Disclosure Bulletin, Vol. 21, No. 9, February 1979, generates words in response to the typing of abbreviations of the words.

Venema, U.S. Pat. No. 4,893,238, Levin, U.S. Pat. No. 4,760,528, Howell et. al., U.S. Pat. No. 4,459,049, and Goldwasser, U.S. Pat. No. 4,891,786, also use abbreviations to type words.

DISPLAYS OF KEYBOARD FUNCTIONS:

Knowlton, U.S. Pat. No. 3,879,722, provides an optical means to impose images from a CRT screen to a keyboard.

Buric et. al, U.S. Pat. No. 4,333,097, in a system using multiple sets of functions for keys, responds to key operations with a display of the resulting new set of key functions on a keyboard map.

Eibner, U.S. Pat. No. 4,425,627, displays functions responsive to function key operations.

Pick, U.S. Pat. No. 4,185,282, displays a keyboard map of key assignments for different languages.

Goldwasser, U.S. Pat. No. 4,891,786, displays words associated with keys on a keyboard map. The set of words displayed changes in response to key operations to show the words available from the next stroke.

WORD & SUFFIX TYPING:

Chang, IBM Technical Disclosure Bulletin, Vol. 22, No. 6, November 1979 teaches the typing of words from standard keys and a split space bar.

Hayashi et. al., U.S. Pat. No. 4,396,992, type words from keys preceded by the space bar and suffixes from keys preceded by letters, all if followed by a special key.

Hanft et. al. U.S. Pat. Nos. 4,374,625 & 4,464,070, type suffixes from keys with the suffixes depending upon the preceding string of characters typed.

Yoshida, U.S. Pat. No. 4,420,817, uses inflection rule patterns and control to minimize the memory required in a lanaguage translator.

Goldwasser, U.S. Pat. No. 4,891,786, uses the '/' key in combination with other keys to type suffixes appended with spelling changes when necessary.

IDEOGRAPHIC TYPING:

Tzu-Hung Li, U.S. Pat. No. 3,950,734, divides Chinese characters into a prefix and a suffix related to one of 10 primary character elements. The 10 prefixes and the 10 suffixes are further divided into 100 divisions. A 100 key keyboard then provides for typing prefix and suffix combinations in two strokes to specify the Chinese characters.

Greanias, et. al, U.S. Pat. No. 4,365,235, provides for the entry of Chinese/Kanji characters in response to a pen moving as to write them on an electronic tablet. Stroke analysis determines one of 42 categories and crossing of previous strokes and uses the data to identify 72 symbol elements, or "alphabetic" components. The sequence of "alphabet" components determines the words written.

Lee, U.S. Pat. No. 4,462,703, defines a set of basic stroke patterns which form Chinese characters and uses them for analysis.

Wang Young-Min, U.S. Pat. No. 4,684,926, arranges selected roots on 25 keys of a standard keyboard to obtain Chinese characters.

Andrew Chui, U.S. Pat. No. 4,689,743, encodes Chinese characters by basic stroke elements and sequences and then orders characters having the same codes by the degree of complexity.

OTHER SYSTEMS:

The article, "Multilingual Word Processing", Joseph. D. Becker, in the Scientific American of July 1984, discusses a phonetic conversion system to type Japanese. The user types words in a phonetic alphabet to computer apparatus which searches a dictionary to find the words having the input sound strings. If the sound strings match more than one word, the user additionally selects the word wanted.

Most of the foregoing systems combine chord typing with regular typing. Goldwasser and Rollhaus et. al., for example, use the time intervals between key operations to distinguish chords and regular typing. Arellano et. al. Todd, Chang, Hayashi et. al., Venema, and Goldwasser, use dedicated strings or special keys to mark inputs for words.

REMAINING PROBLEMS:

Important, if not vital, for the commercial success of new text input systems is fitting into the present computer environment along with a wide variety of other programs.

New typing systems must work with conventional typing and have appeal for present typists. They must have the potential for major increases in typing speed while being learnable on-the-job with minimal losses in productivity.

SUMMARY OF THE INVENTION

The overall objective of the present invention is the faster and easier production of text responsive to input from a keyboard or a mouse type device.

An objective of the present invention are systems of the aforegoing type which are compatible with text editor, word processing, and other programs.

Another objective of the present invention are keyboard systems of the aforementioned type which work in combination with conventional typing.

Still another objective of the present invention are keyboard systems of the aforementioned type which allow typists to add small numbers of system words at a time to conventional typing on-the-job.

Yet another objective of the present invention are keyboard systems of the aforementioned type which, while installed, can easily be turned off to restore normal operations for any purpose and then back on for text operations.

A further objective of the present invention are stroke systems of the aforementioned type which input text from the minimum movements of a mouse, or other device, along with mouse button keys or other auxiliary keys.

A further still objective of the present invention are stroke systems of the aforementioned type in which a set of 24 minimum movements and two auxiliary keys select words and letters, suffixes, endings and editing actions.

A further still objective of the present invention are stroke systems of the aforementioned type which display the set of up to 24 letters words or other items for selection in relative positions that associate the items with the strokes, or movements, which select the respective items.

Still further objectives of the instant invention will become apparent from the following description and claims.

The present invention systems, herein referred to as Computer Assisted Text, or CAT, systems, include embodiments for both keyboard and mouse type device, or stroke, inputs. The program modules which implement both types intercept the inputs to host systems and run on the host computer apparatus. The objectives are to more efficiently produce text inputs for applications programs. Both types of embodiments store sets of word stems, sets of suffixes, or inflections, including a standard suffix set, and sets of modifications of stem end and suffix start spellings. Word stem codes specify suffixes, or inflections, not in the standard suffix set.

Users of the instant invention embodiment generally find wanted words by inputting successive starting letters. A letter string store holds the letters which access sets of words starting with the letters stored. The stored letter strings become members of the word sets accessed. Display of currently accessed word sets enables users to find the words wanted. When a wanted word shows up, the user selects the word for output or for the application of a suffix or inflection. If the wanted word does not show up, the user continues to input letters to complete it. Users can apply standard suffixes to speed up completion of wanted words.

In keyboard embodiments, holding keys operated with one hand enables other hand keys to select words and apply suffixes or inflections or both. Adding a second other hand key gets the most frequent inflected form instead of a word. The keys can be operated nearly together for very rapid typing. Standard suffixes apply to letter strings with no assigned sets, or longer than the selected switch point, or enbled by a key. Users select switch points to add CAT words a step at a time to regular typing on-the-job. With key up, the Space Bar outputs the letter string typed in approximation of conventional typing.

To insure workability with all types of applications programs after installation, the CAT embodiments include On/Off switching. The Off condition restores normal operation. To minimize the need for the Off condition, the CAT systems only start words with letter keys or the Space Bar held and no Alt or Ctrl Shifts. The CAT system further includes the ability to individually output letters used for selection in control chains. Conventional typing, enhanced with the ability to add standard suffixes and Punctuation Strings, blends well with typing of CAT system words. The easy mixing of conventional typing and CAT words enables typists to add CAT words a step at a time on-the-job.

The stroke embodiments combine the execution of 24 strokes by a mouse type device and the operation of a few auxiliary keys to produce text. The 24 strokes consist of minimal movements in one of eight directions and in one of three patterns, staight, clockwise, and counter clockwise. The auxiliary keys can be part of the mouse type device or be located for operation by the other hand. Putting 'x' and 'z' with 'y' fits the 26 letters to 24 strokes. The 'y' word sets include words starting with 'x' and 'z' and an extra stroke, or auxiliary key, obtains 'x' or 'z' as separate letters.

Strokes select words, store letters, and access next word sets. Auxiliary keys output the selected words or inflected forms and may enable suffix or endings or editing sets for the next stroke. The latter leave the auxiliary keys with additional choices for next sets. The set displays present the letters and words or suffixes for selection in positions that associate with their assigned strokes. Words are assigned and positioned as closely as possible to their next letters. Users knowing the next letters of wanted words thus know where to look for possible matches.

DESCRIPTION OF THE DRAWINGS

The aforegoing and other objects, features, and advantages of the invention will be apparent from the following descriptions of preferred embodiments of the invention illustrated in the accompanying drawings.

FIG. 4 is a diagram of a word set packet for a set vocabulary.

FIG. 5 is a partial block diagram of an arrangement of word set packets in a set vocabulary.

DESCRIPTION OF THE PREFERRED EMBODIMENTS

Figure 1:
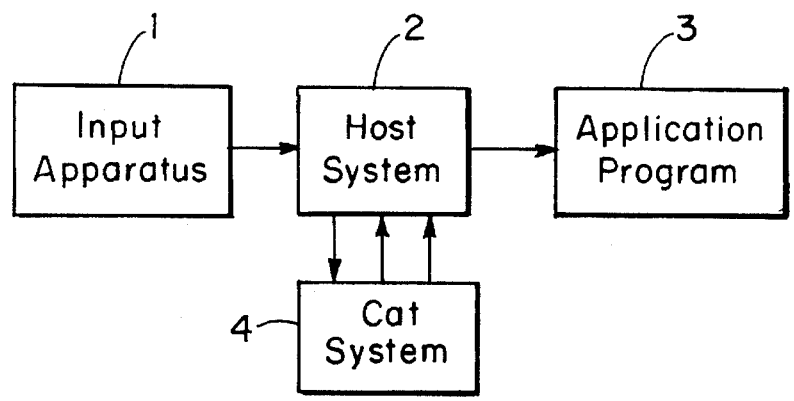
FIG. 1 is an overall functional block diagram of both types of embodiments of the present invention.

FIG. 1 is a general block diagram of both types of embodiments of the present invention. Input apparatus 1 may be a keyboard or a mouse with auxiliary keys. Host system 2 is computer system receiving inputs from input apparatus 1 for the application program 3 that it is running. CAT 4 is a program module which intercepts the signals from input apparatus 1 to host system 2, processes the signals to produce text outputs for application program 3, and returns the text outputs to host system 2. CAT 4 passes the signals it doesn't use for text back to host system 2.

Figure 2:
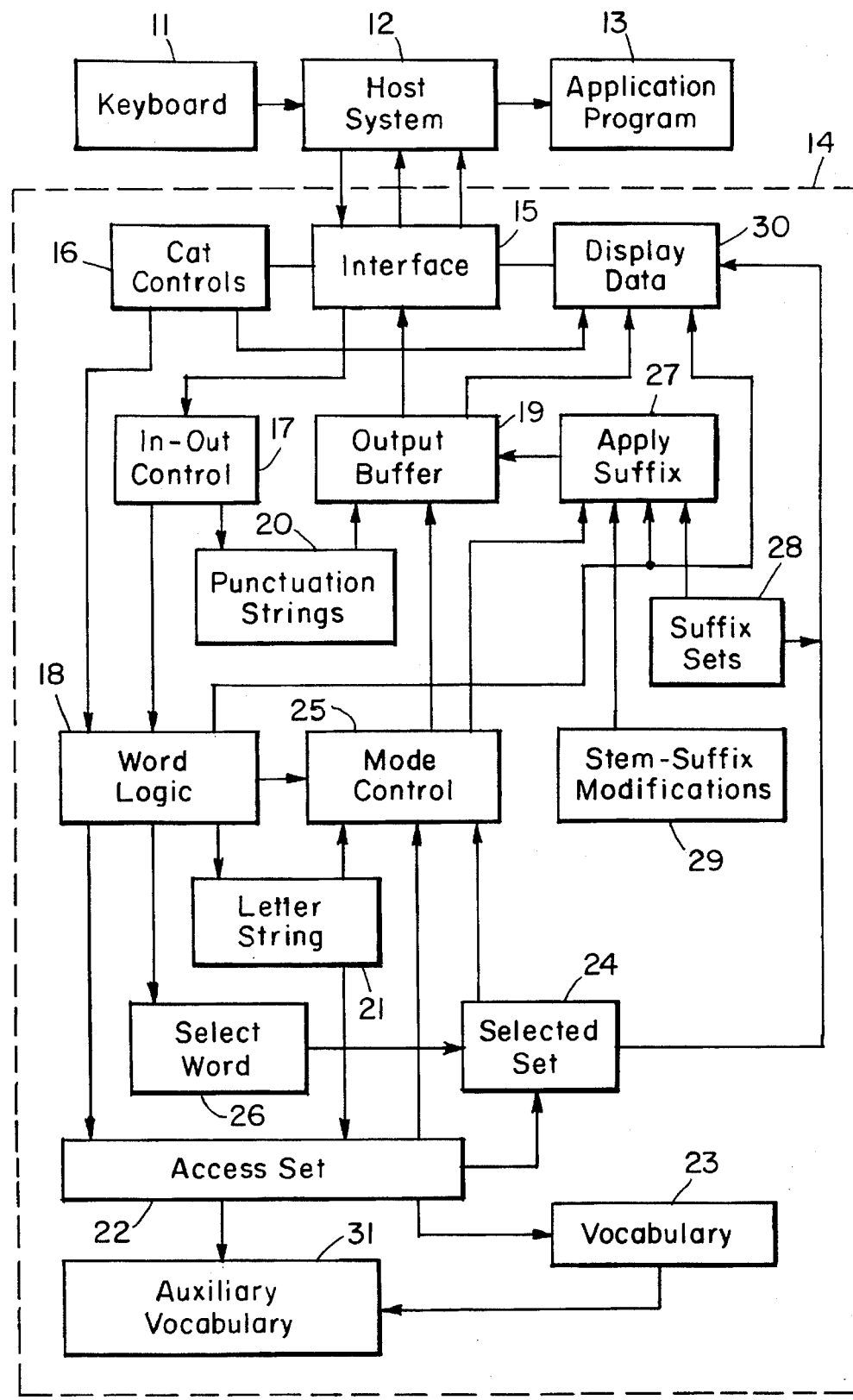
FIG. 2 is an overall functional block diagram of a keyboard embodiment of the present invention.

FIG. 2 is a general functional block diagram of the keyboard embodiments of the instant invention. Keyboard 11 is one which outputs scan codes to signal key operations to host system 12. Host system 12 translates the scan codes to other codes for input to application program 13. Host system 12 also applies display data to the screen and is part of a computer operating system, such as DOS or Windows. Applications program 13 is any program, such as a word processor, which runs on host system 12 and uses keyboard input. Some operating systems, such as Windows, run several programs 13 at a time but generally supply keyboard input to only one at a time.

CAT system 14 takes over some or all of the processing of keyboard inputs with the objective of producing text for application program 13 with fewer key strokes. Interface 15 hooks into host system 12 to obtain the keyboard 11 scan codes and to supply CAT system 14 outputs and display data to host system 12. CAT system 14 outputs may be scan codes or translated codes depending on how interface 15 hooks into host system 12. Interface 15 is set up for the type which can most easily be returned to the particular host system 12 or which attains the best overall efficiency. Scan codes require less processing and leave any translation up to the particular host system 12.

Controls 16 monitors scan codes obtained by interface 15 for the key combinations to set up states and control values. The CAT Off state switches interface 15 to the condition that restores host system 12 to normal operation. (Except for the CAT On state key combination.) The CAT On state sets interface 15 up for operations with CAT system 14. In the CAT On state, controls 16 also responds to the key combinations that control displays and select the point for switching to conventional typing. These actions will be discussed later with the functions affected.

In the CAT on state, in-out control 17 receives scan code inputs from interface 15. In-out control 17 keeps track of shift states and system states and translates scan codes as necessary. State and key type determine whether codes go to word logic 18 or to output buffer 19. The codes to word logic 18 produce word outputs. The codes to output buffer 19 return via interface 15 to host system 12. Control 17 enables output buffer 19 to output its contents to interface 15 and sends no codes to word logic 18 until output buffer 19 is empty. Punctuation strings 20 monitor the codes to output buffer 19 and add punctuation string codes when a flag indicates that the last output was a word.

Key codes to word logic 18 result in words being put in output buffer 10. The words are expressed by scan codes or translated codes as needed for handling by interface 15. Holding a letter key operated with one hand enables other hand keys to substitute other words of the set selected by the letter key in output buffer 19. Other hand keys also apply suffixes to words in output buffer 19. Word logic 18 sends a "word ended" signal to control 17 to enable output of words in output buffer 19. Control 17 also enables output in response to scan codes for keys not used for words. The scan codes or their translations are first put in output buffer 19 to follow the word.

On receipt of a letter key down scan code, word logic 18 sends the letter to letter string 21 which stores it and passes it on to access set 22. Access set 22 looks in vocabulary 23 for the word set assigned to the contents of letter string 21 and copies the set to selected set 24. Mode control 25 passes the most frequent word from selected set 24 to output buffer 19 and the stem code of the word to apply suffix 27. If access set 21 does not find a set, it signals mode control 25 to instead put the contents of letter string 21 in output buffer 19. Mode control 25 then passes any following letters on to output buffer 19.

With the letter key held by one hand, operation of other hand keys produce signals to select word 26 or to apply suffix 27. Select word 26 responds to some keys by selecting a word from selected set 24. If the word is new, mode control 25 puts it in output buffer 19 and sends its stem code to apply suffix 27. Apply suffix 27 responds to other keys by applying an inflection, or suffix, to the word in output buffer 19. Apply suffix 27 uses the stem code and suffix set 28 to find the inflection, or suffix, for the key and either uses spellings specified by the stem code or spelling rules and look-ups in stem-suffix modifications 29 to apply the selected suffix with proper spelling.

Also with a letter key held, the Space Bar signals mode control 25 to put the contents of letter string 21 in output buffer 19 for application of a suffix. With no stem code, apply suffix 27 applies a standard suffix from suffix set 28 in response to an other hand key. Operation of the 'Tab' or 'Enter' key sets the "compound" flag to set up compounding with the next word. The "compound" flag cancels the normal insertion of a 'Space' character ahead of the next word in output buffer 19. (The normal insertion produces a 'Space' to follow the last word.) Operation of any other hand key or one of the aforegoing enables word logic 18 to send a "word ended" signal to control 17 on letter key release.

Display data 30 supplies data to interface 15 for display by host system 12 to assist users. Display data 30 obtains data from output buffer 19, selected set 24, suffix set 28, and word logic 18 to set up the display. Output buffer 19 holds the last selected word, selected set 24 the words available for selection, apply suffix 27 the stem code of the selected word and suffix set 28 both the suffixes for the stem code and a set of standard suffixes. Word logic 18 indicates whether left or right hand keys have the word and suffix assignments. (The hand keys indicated are those for the hand other than the hand holding the letter key.)

Display data 30 receives Tutor On/Off state inputs from CAT controls 16. In the Tutor Off state, display data 30 only passes the data required by experienced users. This data consists of the word in output buffer 19 and words and suffixes available for selection. In the Tutor On state, display data 30 adds data to assist beginning users. The added data includes the set of most frequently used words and the set of suffixes assigned by default to any otherwise empty key slots. This data is fixed so its display is only helpful for a short time. Tutor Off displays obscure less of document screens and all data is essential.

Release of letter keys enables the following:

a) The Space Bar outputs the contents of letter string 21 as a word.

b) The 'Enter' key outputs the contents of letter string 21 as a prefix.

c) The 'Tab' key outputs the contents of output buffer 19 for compounding with the next word.

d) The apostrophe key adds a possessive ending to the contents of output buffer 19 and signals "word ended".

e) The Backspace key removes the last letter from letter string 21 and signals access word set 22 to reselect the preceding set.

f) The Backspace key and Ctrl Shift clears letter string 21 and output buffer 19.

CAT controls 16 supply a switch point value to word logic 18. When the number of letters in letter string 20 exceed the switch point, word logic 18 signals mode control 25 to pass letter string 21 and any following letters to output buffer 19. Typists set the switch point to add CAT words a step at a time to conventional typing on-the-job. They may start, for example, with a mix of most frequent CAT words and enhanced regular typing for text documents. The punctuation string enhancement is easy and applying suffixes to regular typing can be adopted gradually.

Auxiliary vocabulary 31 includes one or more sections with special groups of words. One group might consists of proper nouns, distinguishable to typists because they start with a shift key. Other groups might consist of legal terms, medical terms, technical terms, etc. A section might also hold the infrequent words too short to be members of assigned sets in vocabulary 23. Alternatively, a section might split some of the more frequent words with vocabulary 23. Access set 22 responds to some key sequences to look via vocabulary 23 for words in vocabulary 31 and to others to look directly in vocabulary 31.

The following table shows the responses of CAT controls 16 in one embodiment of CAT systems 14. For CAT Off, CAT controls 16 only looks for, and responds to, Left Shift+Right Shift to turn CAT On. Interface 15 sends the scan codes to CAT controls 16 for this monitoring. For CAT On, controls 16 turns CAT Off when it finds Right Shift+Left Shift. Users can thus turn CAT On for text and Off for critical non-text functions with these easy to execute Shift key combinations. Left Shift+Escape+a Digit key selects Switch Point values and turns the Tutor Display On and Off.

TABLE OF RESPONSES OF CAT CONTROLS 16

CAT OFF:
  Left Shift + Right Shift---turns CAT On.
CAT ON:
  Right Shift + Left Shift---turns CAT Off.
  Left Shift + Escape + Digit key for:
    1---Switch Point after one key stroke.
    2---Switch Point after two key strokes.
    3---Switch Point after three key strokes.
    4---Switch Point after four key strokes.
    5---Switch Point after five key strokes.
    6---Switch Point Off. (All key strokes for CAT.)
    7---Tutor Display Off.
    8---Tutor Display On.

The following table shows CAT On responses of in-out control 17 for some CAT models. If no Alt or Ctrl Shift, control 17 sends word starting keys to word logic 18. One model uses only the letter keys to start words. Another model has the Space Bar operated to start words with letter keys, the digit keys and the ;,./ keys. Yet another model uses both of the aforegoing sets to start words. In the Alt or Ctrl Shift states, control 17 sends the aforegoing keys to output buffer 19 for return to interface 15 along with the keys which do not start words. An extra stroke can even return letters that start words for controls selections. CAT Off is thus rarely needed.

With a word started, the models have control 17 sending letter keys, the ;,./ keys, 'Tab', 'Enter', Space Bar, Backspace, and the '\' key to word logic 18. Control 17 puts other key characters in output buffer 19 following the word present before enabling output buffer 19 to output its contents. Keys starting control actions, such as the function keys or Alt or Ctrl Shift, cause control 17 to clear first clear output buffer 19 and letter string 21 before responding.

TABLE OF IN-OUT CONTROL 17 RESPONSES

No Word Started:
  If no Alt or Ctrl Shift:
    Letter scan codes go to word logic 18.
    In some models, Space Bar + letter and ;,./ key
      scan codes also go to word logic 18.
  Else
    Scan or translated codes go to output buffer 19.
Word Started:
  Letter and ;,./ keys + Backspace, Space Bar, 'Enter',
    'Tab', and '\' key scan codes to word logic 18.
  Other character key codes inserted after word in
    output buffer 19 and output then enabled.
  Punctuation keys add Punctuation keys add Punctuation
    Strings if preceding output was a word.
  Function and Shift keys clear output buffer 19 and
    letter string 21 before being returned.

Word logic 18 manages the production of words in CAT system 14. Word logic 18 converts letter key scan codes from control 17 to ascii, or other, letter codes and stores the converted codes in letter string 21. If the letter count is less than the switch point, access set 22 searches vocabulary 23 for the word sets assigned to the contents of letter string 21. Else the letter string goes to output buffer 19. If an assigned set, the most frequent word of the set goes to output buffer 19. Else the contents of letter string 21. Keys with Space Bar result in searches of auxiliary vocabular 31 to similarly start words except that non-letter keys are discarded.

Other-hand keys are the keys for the hand other than the one holding the letter key. Other-hand keys select other words of the selected set via select word 26 or apply suffixes via apply suffix 27. A second same row other-hand key changes selected word stems to their most frequent inflected form. After word selection, all other-hand keys have suffixes assigned, the set for the selected stem being supplemented as necessary by standard suffixes. The Space Bar makes the letter string the selected word. The 'Tab' or 'Enter' keys output the selected word for compounding.

If any of the aforegoing keys are operated while a letter key is held, release of the letter key outputs the contents of output buffer 19. Else the following keys can perform their various functions. The Space Bar outputs the contents of letter string 21 as a regularly typed word. The 'Enter' key outputs the string as a prefix with no 'Space' to follow. The 'Tab' key outputs the contents of output buffer 19 as a word for compounding. The '\" key adds an apostrophe or an apostrophe and 's' for the possessive case. The Backspace key backsteps the system to the preceding letter.

Operation of non-letter keys after letter key release puts the key code in output buffer 19 following the word or string already there and then outputs output buffer 19. The key characters then immediately follow the letter or string outputted. Punctuation keys additionally follow the key code with Punctuation Strings like those from Punctuations Strings 20. Punctuation Strings consist of 'Space' characters and, in the case of sentence enders, the setting of a flag to capitalize the next sentence start. Words outputted by letter key release attain the same result from the subsequent operation of the non-letter keys. This occurs because the 'Space' characters that otherwise follow words are in output buffer 19 ahead of the next word. Any non-word output cancels the 'Space' character.

---

TABLE OF WORD LOGIC 18 RESPONSES

---

Letter Key Down:
    Stores letter in letter string 21.
    If < switch point, access set 22 looks for set.
        If assigned set, MF word to output buffer 19.
        Else, letter string to output buffer 19.
    Else, letter string to output buffer 19.
    Other-Hand Key Down:
        Selects different word from selected set 24.
            Second Key selects inflected form.
        Applies suffix to word in output buffer 19.
    Space Bar Down:
        Letter string to output buffer 19 for suffix.
    'Tab' or 'Enter' Down:
        Outputs word for compound.
Letter Key Up:
    If any of above keys operated, output word.
    Else:
        Space Bar outputs letter string as word.
        'Enter' outputs letter string as prefix.
        'Tab' outputs word for compound.
        '\" Key adds the Possessive ending.
        Backspace steps back to preceding state.
    Non-Letter Key Down:
        Key character to follow word in output buffer 19.
Exception: Punctuation key also adds Punctuation String.
        Output contents of output buffer 19.

---

CAT system 14 considers the keys for the characters "12345 qwert asdfg and zxcvb" to be left hand keys and those for "67890 yuiop hjkl; nm,./" right hand keys. Other-Hand keys, as previously stated, are those for the hand other than the one holding the letter key operated. (i.e. If the letter key is a left hand key, the Other-Hand keys are the right hand keys and vice versa.) Other-Hand keys in a model may, or may not, include the digit keys. Word sets can thus have 15, and even 20, members. Some models have smaller word sets and other assignments for Other-Hand keys.

The most frequent word of sets has pre-selected status but require another key operation for output. Its inflected forms are valuable as Other-Hand assignments as a key then applies a suffix and sets up the selected form for output. The other words have to first be selected by an Other-Hand key. The inflected forms, or suffixes, of the selected word then become the Other-Hand key assignments. A shortcut for outputting the pre-selected word is a second letter hand key.

A similar shortcut for the most frequent inflected form of other words is a second Other-Hand key with the one selecting the word. The shortcuts may save a little time.

The choice of word set sizes for models is a bit complicated. Beginning typists and those eager for maximum speed will prefer 15 next most words for at least the first letter sets. With some practice, users can type these words very rapidly by striking letter and Other-Hand keys nearly together. Skilled typists may prefer smaller sets that make more use of their existing skills, require less new learning and time to read. The frequencies of words for sets after the first letter sets drop off and rapid typing yields a smaller return. Smaller sets that can be read quickly and typed rapidly without drill. Other-Hand keys can replace words with suffixes and punctuation for pre-selected words.

Inclusion of the Space Bar and key combination to start words in a model provides an alternative way of typing the most frequent words and fast access to auxiliary vocabulary 31. The keys with the Space Bar are not limited to the letter keys and each selects a most frequent word, or MFW. Release of the key before another key operation outputs the MFW. Users can thus hold the Space Bar and type MFWs with single keys. After the MFWs, the word sets can be Proper Nouns, short words, or whatever best supplements vocabulary 23. Other special vocabulary sections for medical terms, legal terms, etc. are accessible via punctuation and letter keys with small word sets with a single stroke penalty.

Figure 3:
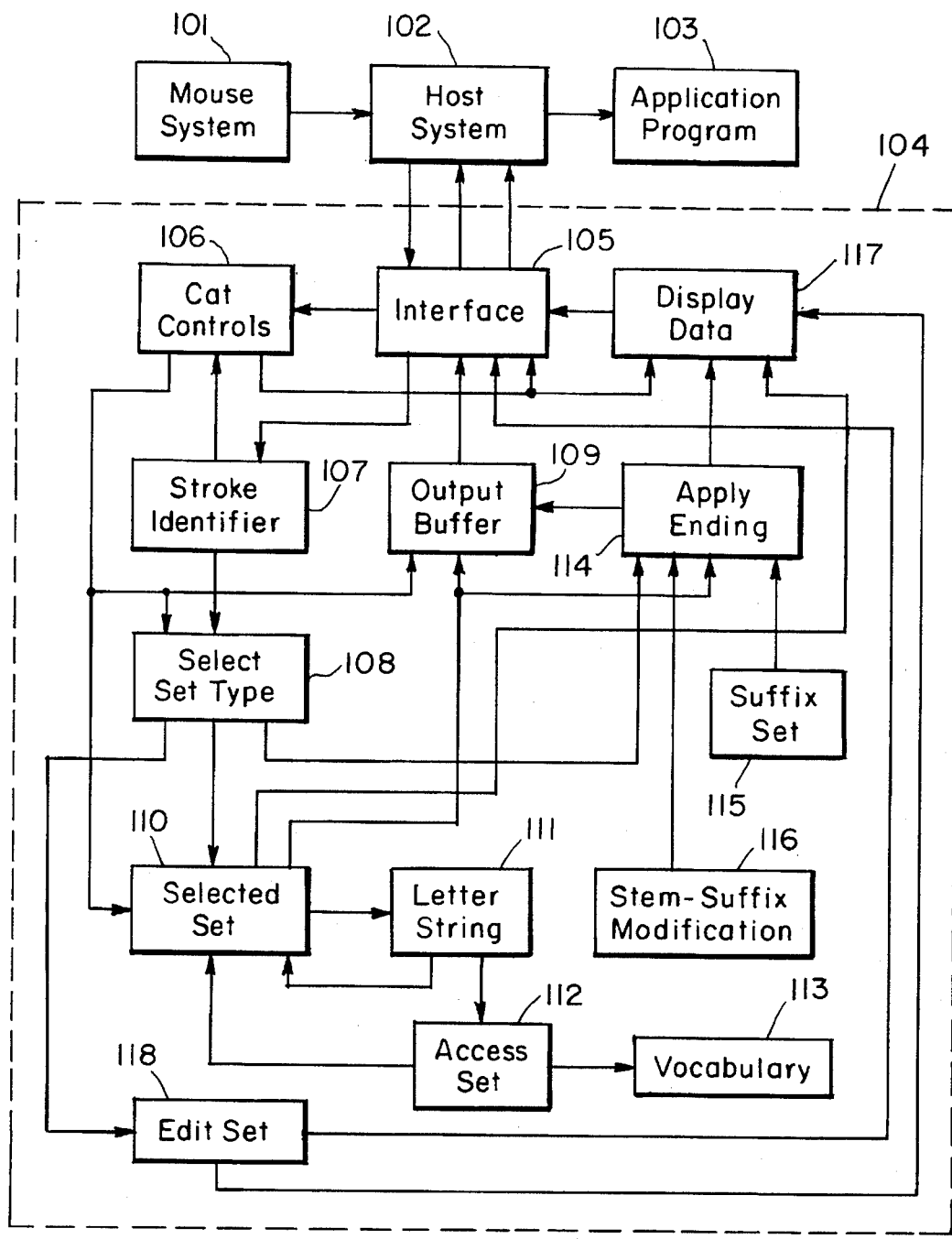
FIG. 3 is an overall functional block diagram of a stroke system embodiment of the present invention.

Referring now to FIG. 3, mouse system 101 consists of a mouse type device which may include one or more switches. Host system 102 is a computer system with an operating system program including means for processing mouse system 101 signals to produce inputs to applications program 103. The mouse system 101 signals include mouse motion signals and mouse switch signals. CAT system 104 is a stroke system for producing text outputs in response to inputs from mouse system 101. Interface 105 obtains the mouse system 101 signals from host system 102, sends the mouse switch signals to CAT controls 106 and the mouse motion, or position, signals to stroke analyzer 107.

CAT controls 106 in the CAT Off state has interface 105 return the mouse signals to host stem 102 but allow CAT controls 106 and stroke identifier 107 to look for CAT On inputs. A CAT On signal sets CAT controls 106 and interface 105 to the CAT On state. In the CAT On state, CAT controls 106 sends mouse switch signals to switch set type 108, output buffer 109, and selected set 110 as well as to interface 105 and display data 117. Stroke identifier 107 analyzes the mouse motion signals to identify the prescribed patterns, or strokes, executed by mouse movements. The stroke outputs go to CAT controls 106, select set type 108, apply endings 114, and edit set 118.

CAT controls 106 receives the mouse switch signals from interface 105 and the stroke outputs from stroke identifier 107. CAT controls 106 set and reset the state of interface 105 in response to CAT On and CAT Off signals respectively. The CAT On and CAT Off signals may be from either, or both, the mouse switch signals or the stroke outputs. Either, or both, may also produce signals to output buffer 109, select set type 108, and selected set 110. A signal to select set type 108 routes the stroke outputs from stroke identifier 107 to selected set 110, or to apply ending 114, or to edit set 118.

On word starts, CAT controls 106 resets selected set 110 to its word start set and sets select set type 108 to send stroke signals to selected set 110. Selected set 110 sends the word start set to display data 117 which organizes the set data and sends it along via interface 105 to host system 102 for a presentation of the words available to the next stroke. The stroke output to selected set 110 selects a word of the word start set and a letter. Selected set 110 sends the letter to letter string 111, the word to output buffer 109, and the stem inflection code of the word to apply ending 114.

The letter triggers access set 112 to find the word set assigned to the letter in letter string 111 in vocabulary 113. When access set 112 finds a word set, it copies it to selected set 110. Letter string 111 sends the letter string held to selected set 110. Selected set 110 sends the words of the accessed word set and the letter string to display data 117. The words and the string are then presented as available for selection by the next stroke. When the wanted word is in output buffer 109, CAT controls 106 signals output buffer 109 to output the word held in response to a mouse switch or a particular stroke from stroke identifier 107.

If the word in output buffer 109 needs an ending, a different mouse switch or stroke to CAT controls 106 results in a signal select set type 108 that routes the next stroke to apply ending 114. Strokes to apply ending 114 may apply a suffix, a Punctuation String or other characters. Apply ending 114 uses suffix set 115 and stem-suffix modification 116 along with the stem inflection code from selected set 110. Application of a Punctuation String is followed by output of output buffer 109 to interface 105. After the first stroke, apply ending 114 changes the members available for selection by the following stroke. The new set depends on the suffix or character applied.

Before a word start or after a word is outputted, users may edit the document of the applications program 103 by operating a mouse switch or executing a particular stroke. CAT controls 106 responds by signaling select set type 108 to route the following strokes to edit set 118. Edit set 118 then responds to strokes by sending the characters or signals of the first edit set selected to interface 105. The first selection also selects one of the plurality of second edit sets for the next stroke. Successive strokes can thus send a wide range of successive editing directions via interface 105 to applications program 103.

Display data 117 organizes the members of the active set of selected set 110, or apply ending 114, or edit set 118 for the desired presentation. Display data 117 then supplies the arranged data via interface 105 to host system 102 for display. The display presents the set members in locations which associate them with the strokes which select them. When users spot the wanted word or other member, the location indicates the stroke to select it. Presenting the set members in a circle would conform directly with the patterns shown in FIG. 6 but a rectangular shape is easier to implement and also associates strokes and items.

Figure 6:
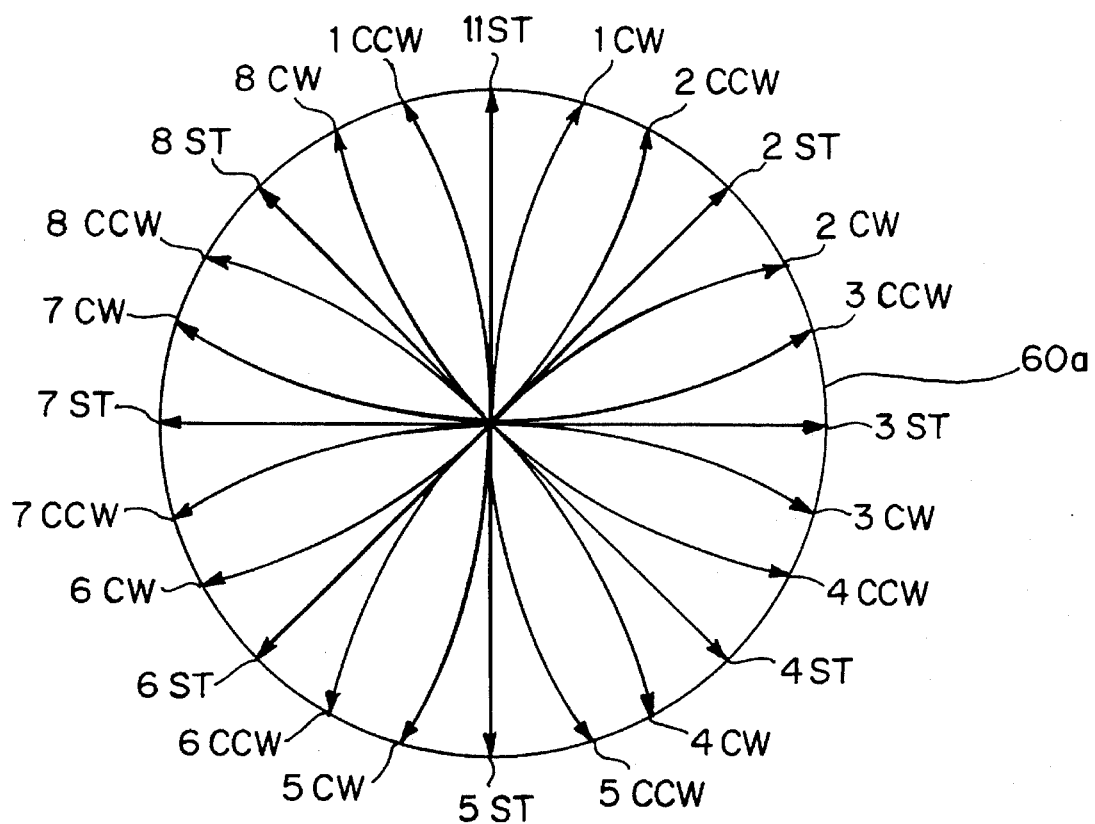
FIG. 6 shows a set of 24 strokes for a common center for a mouse type device.

FIG. 6 shows a set of 24 strokes with eight straight strokes in eight equally spaced apart directions. A pair of curved strokes, one curved clockwise and the other curved counterclockwise, are adjacent each straight stroke. These strokes are easy to execute reliably while observing a display if the mouse type device and the hand holding it are maintained in a fixed orientation. The user then has a tactile sense of stroke direction with respect to the fixed orientation. A finger or a mouse feature can be thought of as pointing in a reference direction.

As described, selected set 110 has a succession of word sets active. The word start set has a word and a letter for each of the 24 strokes. If the signals from CAT controls 106 to select different set types and output words are only from mouse switches, then the following word sets may also have 24 members. In some models, however, stroke inputs to CAT controls 106 produce the signals. The following word sets must reserve one or more strokes for the signals to controls 106. The following word sets, for example may have 22 words and letters, one member to output words, and another to select apply ending 114. Examples of the two types of word sets follow:

| | | | WORD START SET CHART | | | | | |
|---|---|---|---|---|---|---|---|---|
| and a | be b | by c | the d | of e | for f | he g | his h | in i |
| a y | | | | | | | | l j |
| with w | | | | | | | | |
| as v | | | | | | | | that k |
| at u | this t | is s | are r | but q | to p | on o | not n | was l |
| | | | | | | | | had m |
| | | | SECOND WORD SET CHART | | | | | |
| want a | war b | water c | way d | we e | week f | well g | were h | will i |
| WORD OUT (y) | | | | | | | | ENDING (j) |
| w | | | | | | | | |
| v | | | | | | | | k |
| | | | | | | | | l |
| | u | t woman s | work r | | world p | would o | n | m |

The Word Start Set Chart has 24 letters in a clockwise pattern from 'a' at the upper left to 'y'. ('x' and 'z' are missing.) The 24 most frequent words are disposed with the letters in a more or less arbitary fashion by way of example. The Second Word Set Chart shows two of the 24 letters, 'y' and 'j' in '( )' to indicate they are not available. Words of a set starting with 'w' are arranged according to their second, or next, letters. The words with 'a' as the next letter, start with the 'a' letter position, those with 'e' start with the 'e' position, the one with 'i' on 'i', and those with 'o' start with the 'o' position.

Users know the next letter of wanted words so this assists the search for wanted words in the word sets. The letters might be arranged outside the words, instead of adjacent to them, to leave more room for the words. The colors of the words might also be changed with changes in the next letter to further assist the user in limiting the search area.

In any case, 24 or 22 strokes do not cover all of the letters. The first apply ending 114 set will include the letters not covered by the sets handled by selected set 110. These letters will be the least frequent to minimize the number of times requiring two strokes for a letter. The other set members include the suffixes, or inflections, for the word in output buffer 109, the Punctuation Strings, output for a compound word, a Backspace, and other word endings. One or more members may be used to get another set of word endings, another suffix set, select edit set 118, etc. The most frequent editing actions may be members of the first set of apply ending 114.

The first set of edit set 118 has the most frequent editing actions as members. Selection of many will activate a following set with choices to complete the editing actions. A set of the possible amounts and directions can provide input for positioning the cursor, a necessary step in many actions.

Access set 22 and vocabulary 23 of FIG. 2 and access set 112 and vocabulary 113 of FIG. 3 use the arrangements of FIGS. 4 and 5, both discussed in the parent case. The 'Set Text & Code Data' of set packet 50 of FIG. 4 hold text and stem inflection codes for each of the plurality of word stems in a word set. 'Code Element' of packet 50 is the set letter to match the last letter of the letter string to which the set is assigned. 'Next Index' of packet 50, which is not necessary in some models, specifies the jump to the start of the following set. 'Branch Index' of packet 50 specifies the jump to the next branch. It will be zero when there are no more branches.

FIG. 5 shows an arrangement of set packets 50 for fragmentary sections of vocabularies 23 and 113. On word starts, access sets 22 and 112 use the first letter, or other attribute, input to find a pointer to line 51*a* or 51*b* and sets 50*a* and 50*b*. Line 51*a* and set 50*a* do not have an adjacent branch and set 50*a* is the word set assigned to the input obtaining the pointer. When access sets 22 and 112 copy set 50*b*, they will have reached the same position as the pointer to line 51*b*. Access sets 22 and 112 compare the first, or next, input with the 'Code Element' of the set packet 50 of set 50*b*. If they match, then the word set is the one assigned to the input.

If the 'Code Element' and input do not match, access sets 22 and 112 use the 'Branch Index' to jump to the next branch. Access sets 22 and 112 compare the 'Code Element' of the branch set 50*b* with the input. The jumps continue until a match is found or there are no more branches. A match of the input and a 'Code Element' signifies that the word set is the one assigned to the input. Access 22 and 112 copy the assigned word set for processing.

I claim:

1. A method for outputting words to an applications program performed by a computer apparatus which runs said applications program and includes a data processing means and an input means in which the data processing means normally processes the signals from said input means for input to said applications program; and by a word producing program run by said computer apparatus and including a control means having an Off state and an On state; the method comprising the steps of:

a) setting said control means to the On state responsive to On signals from said input means;

b) resetting said control means to the Off state responsive to Off signals from said input means;

c) intercepting the signals from said input means while said control means is in the On state;

d) selecting words responsive to the signals intercepted; and e) outputting the words selected to said data processing means responsive to signals intercepted;

wherein said word producing program includes a vocabulary of a plurality of sets of words stems assigned to letter strings from 1 to N letters long; wherein some of the signals of said input means represent letters and wherein step d) includes:

d1) storing the letters inputted;

d2) accessing the set of word stems assigned to the letters stored;

d3) selecting a word from the accessed set of word stems responsive to some of said signals or selecting the stored letter string as a word responsive to another of said signals.

2. The method according to claim 1 wherein the input means includes a keyboard.

3. The method according to claim 2 wherein step e) outputs the stored letter string as a word responsive to the signal produced by the operation of the Space Bar of said keyboard.

4. The method according to claim 1 wherein the input means includes a mouse type device.

5. The method according to claim 4 wherein the input means includes a set of prescribed minimum movement patterns and means for producing signals responsive to movement of the mouse type device in any one of the prescribed patterns.

6. A method for outputting words to an applications program performed by a computer apparatus running said application program and including a data processing means, a memory, a display, and an input means; and by a word producing program running on said computer apparatus and having a vocabulary consisting of a plurality of words arranged into first through Nth pluralities of word sets wherein each of the sets of said first plurality are assigned to single letters and each of the sets of said Nth plurality are assigned to a string of N letters; said method comprising the steps of:

a) starting a word by accessing a first word set;

b) inputting letters responsive to operation of said input means;

c) storing the letters inputted as a letter string in said memory;

d) selecting a word of the accessed set responsive to each letter inputted;

e) accessing the word set assigned to the letter string stored;

f) changing the selected word to a different word of the accessed set responsive to another input from said input means; and g) outputting the selected word or the stored letter string responsive to a signal from said input means.

7. The method according to claim 6 wherein said input device includes a keyboard and including the step of outputting the stored letter string responsive to the operation of the Space Bar of said keyboard.

8. The method according to claim 7 wherein step f) is enabled by holding the last letter key operated.

9. The method according to claim 6 wherein said input device includes a mouse type device and said word producing program has a set of prescribed patterns of minimum movement and wherein step b) is responsive to movement of said mouse type device in prescribed patterns.

10. The method according to claim 9 wherein the mouse type device includes a key and step f) is enabled by operation of the key of the mouse type device to respond to movement of said mouse type device in prescribed patterns.

11. The method according to claim 9 wherein one of the actions selected by movement of said mouse type device in a prescribed pattern is the enabling of step f).

12. The method according to claim 9 wherein movement of said mouse type device in prescribed patterns provides the signals for step g).

* * * * *